March 10, 1931. M. T. SKINNER 1,795,620
ROTARY DISK PLOW
Filed Nov. 30, 1929 2 Sheets-Sheet 2
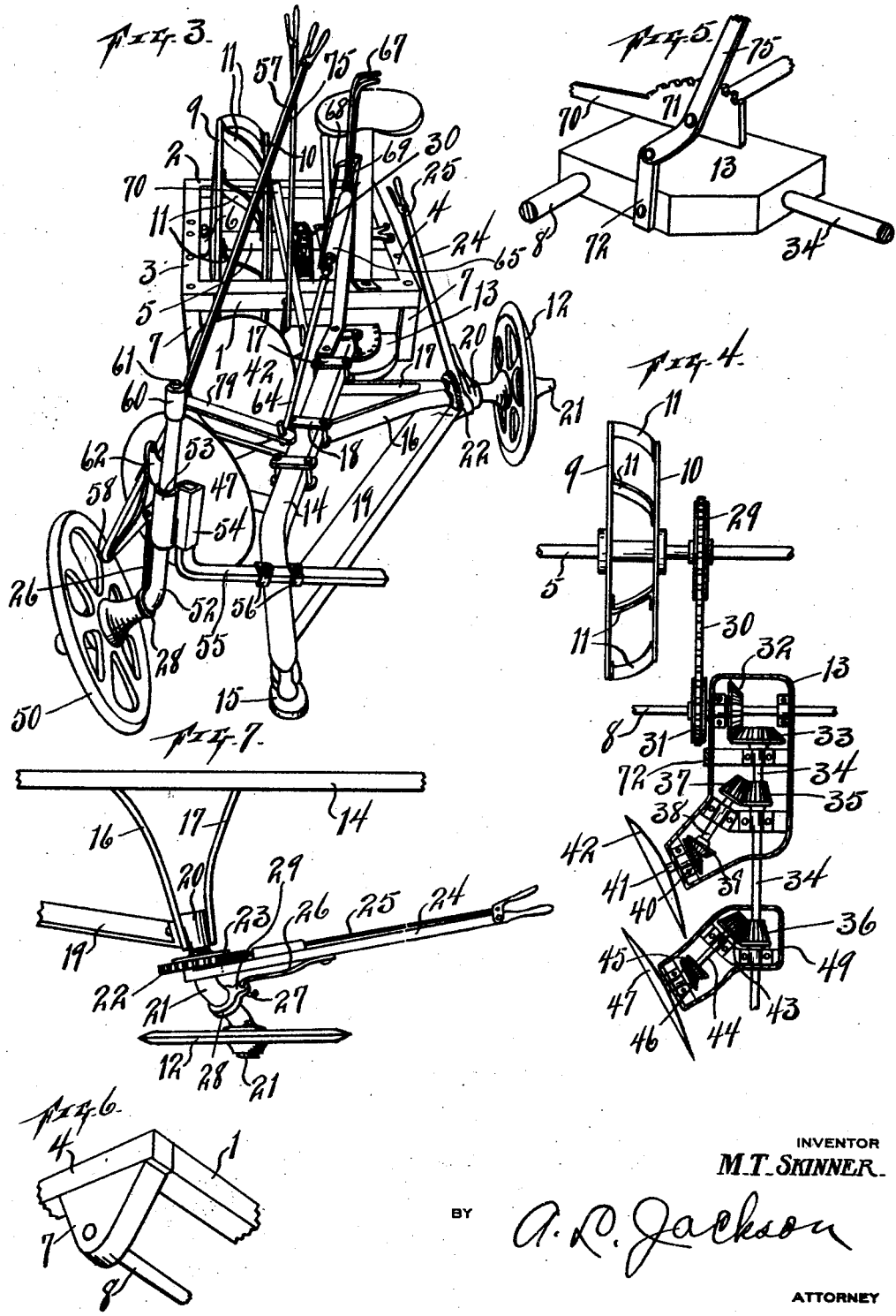
INVENTOR
M. T. SKINNER
BY A. R. Jackson
ATTORNEY Patented Mar. 10, 1931

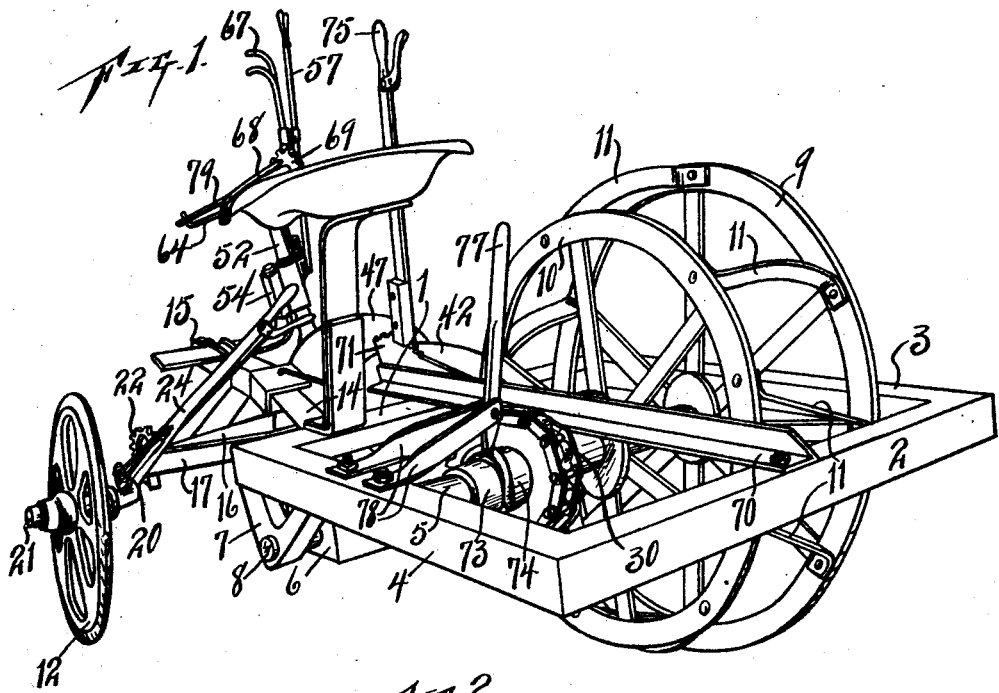

1,795,620

UNITED STATES PATENT OFFICE

M. T. SKINNER, OF FORT WORTH, TEXAS

ROTARY DISK PLOW

Application filed November 30, 1929. Serial No. 410,713.

My invention relates to improved rotary disk plows and more particularly to plows for breaking land preparatory for growing crops; and the object is to provide plows of lighter draft and more easily operated and to provide plows by which a better grade of work may be accomplished in extremely foul, wet or dry land and which will not be choked down in operation. Other objects and advantages will be fully explained in the following description and the invention will be more particularly pointed out in the claims.

Reference is had to the accompanying drawings which form a part of this application.

Fig. 1 is a perspective view of the complete plow assembled.

Fig. 2 is a side elevation of the same.

Fig. 3 is a perspective view of the plow from the front.

Fig. 4 is a plan view of the working parts of the plow.

Fig. 5 is a perspective view of certain working parts of the plow.

Fig. 6 is a detail view of the hanger.

Fig. 7 is a detail plan view of the control devices for the land wheel.

Similar characters of reference are used to indicate the same parts throughout the several views.

The plow is provided with a rectangular frame, having a front member 1, rear member 2, right side 3, and left side 4. The main driving axle 5 is journaled in bearings 6 which are attached to side frame members 3 and 4. Hangers 7 are attached to the main frame and a counter shaft 8 is journaled in the hangers 7. The plow is provided with a main drive and tractor wheel made of two parts 9 and 10 which are made rigid with each other by cleats 11 and the two parts serve as one wheel and the wheel is keyed to and made rigid with the main axle. The main beam 14 is attached to a bracket housing 13 which is attached to the main frame by means of the hangers 7. The beam 14 carries the hitch 15. The land wheel 12 is supported from the main beam 14 by brackets 16 and 17 which are attached to the main beam 14 by U bolts 18 and suitable nuts. The cleats or brackets 17 and 18 are braced by the bar 19. The bar 19 and brackets 17 and 18 are rigidly attached to a casting 20 and a spindle 21 is rotatably mounted in the casting 20 and the land wheel 12 is mounted on the spindle 21. A sector 22 is rigidly attached to the bracket casting 20, the flange 23 being a part of the casting 20. A lever 24 pivotally engages the spindle 21 and a spring-actuated dog 25 is adapted to engage the sector 22. The wheel 12 runs on the unploughed ground. The spindle 21 is in the shape of a crank and the lever 24 by reason of the dog 25 and sector 22 is used to raise or lower the frame of the plow for varying the depth of the plows. The lever 24 controls the spindle 21 by an arm 26 which has a hook 27. A collar 28 is clamped on the spindle 21 and this collar has a perforated lug 28 to engage the hook 27 so that the spindle 21 may be turned.

The main shaft 5 drives a sprocket wheel 29 which drives the sprocket chain 30. The chain 30 drives a sprocket wheel 31. The sprocket wheel 31 and a bevel gear wheel 32 are formed integral with the same casting and so the wheel 32 is driven. The shaft 8 is non-rotatable. The gear wheel 32 drives a gear wheel 33 which is rigid with a shaft 34. The shaft 34 drives a gear wheel 35 and a gear wheel 36. The gear wheel 35 drives a gear wheel 37 which is rigid with and drives a shaft 38. The shaft 38 drives a gear wheel 39 which meshes with and drives a gear wheel 40 which is rigid with a shaft 41 and drives this shaft. The shaft 41 drives disk 42.

The gear wheel 36 meshes with and drives a gear wheel 43 which drives a shaft 44. The shaft 44 drives a gear wheel 45 which meshes with and drives a gear wheel 46 and gear wheel 46 drives the disk 47.

Suitable bearings for the shafts 8, 34, 38, and 44 are mounted in the housing 13. The housing 13 is attached to the hangers 7 and to the main beam 14. A housing 49 is provided for the gear wheels 36, 43, 45, and 46, and shaft 44. These housings constitute lubricating reservoirs. The housing 49 is attached to the main beam 14.

A steering or guide wheel 50 is provided and mounted on a spindle 51 which is formed on a vertically adjustable bar 52. The bar 52 is provided with a bearing sleeve 53 which is formed on a casting 54 which is supported by a supporting bar 55 which is attached to the main bar 14 by clamps 56. The bar 52 and wheel 50 may be moved vertically and held at different vertical adjustments by a lever 57 which has a fulcrum 58. A rod 59 is attached to the lever 57 and pivotally connected to a collar 60 which is held on the upright bar 52 by a nut 61. When the lever 57 is moved the wheel 50 will be moved. The lever 57 is held at different adjustments by a sector rack 62 and by a dog carried by the rod 63 and adapted to engage the sector 62. The upright bar 52 may be moved forwardly or backwardly for adjusting the wheel 50 by a rod 64 which is connected to the collar 60. This rod 64 telescopes into a tube or pipe 65 which is attached to a support 66 which is attached to the frame. A lever 67 is fulcrumed on the tube 65 and a link bar 68 is operatively connected to the lever 67 and to the bar or rod 64. A segmental rack 69 is attached to the pipe 65 and made rigid therewith. The lever 67 is provided with the usual dog for engaging the cooperating rack sector 69.

A lever 75 is provided for varying the depth of the plowing. This lever is fulcrumed on a longitudinal bar 70 which is attached to frame members 1 and 2. A ratchet segment 71 is made rigid with the bar 70. The lever 75 is pivotally connected to a link bar 72 and link bar 72 is pivotally connected to housing 13. The lever 75 is used to raise and lower the disks 42 and 47.

When the plow is to be transported, the disks are not driven. A clutch composed of two parts 73 and 74 is provided for throwing the disks in and out of gear. A lever 77 is fulcrumed on bracket arms 78 which are attached to frame member 4 and the operative end of the lever 77 engages the clutch for operating the same.

The lever 64 actuates the collar 60 by means of an arm 79 for rotating the upright bar 52.

What I claim is:—

1. A rotary disk plow having a frame, a main shaft journaled in said frame, disks provided with spindles operatively connected to said frame, means for driving said disks from said main shaft, and a supporting and driving wheel in two parts of different diameters rigidly connected together for driving said main shaft.

2. A rotary disk plow having a frame, a main shaft journaled in said frame, disks provided with spindles operatively connected to said frame, gearing for driving said disks from said main shaft, a supporting and driving wheel and tractor wheel in two parts rigidly connected together and of unequal diameters rigid with and driving said main shaft, a guide wheel and a land wheel operatively connected with said frame, and means for adjusting said guide and land wheels.

3. A rotary disk plow having a main frame, a main beam rigid with and projecting from said frame, gear housings rigid with said frame and beam, a main shaft journaled in said frame, a supporting and driving wheel in two parts rigidly connected together and of unequal diameters rigid with and driving said main shaft, disks provided with shafts or spindles projected in said housings, and gearing in said housings driven from said main shaft for driving said disks.

4. A rotary disk plow comprising a frame, a main shaft journaled in said frame, a guide wheel and a land wheel operatively connected with said frame, means for varying the positions of said wheels, a supporting and operating tractor wheel in two parts of different diameters rigid with said main shaft, bearing housings attached to said frame, disks provided with spindles projected into said housings, a counter shaft journaled in one of said housings, gearing for driving said counter shaft from said main shaft, and gearing in said housings operatively connected to and driven by said countershaft.

5. A rotary disk plow comprising a frame, a main shaft journaled in said frame, a supporting tractor wheel rigid with said shaft, hangers attached to said frame, a bearing housing supported by said hangers, a counter shaft journaled in said hangers and housing, sprocket gearing for driving said counter shaft from said main shaft, a driving shaft journaled longitudinally in said housing and projecting therefrom, gearing operatively connecting the latter shaft with said counter-shaft, a disk provided with a spindle projected into said housing, gearing operatively connecting said spindle with said longitudinal shaft for driving the disk, a second housing operatively connected to said frame, a second disk provided with a spindle projected into said second housing, and gearing in said second housing operatively connecting said spindle with said longitudinal shaft.

In testimony whereof I set my hand this 15th day of October, 1929.

M. T. SKINNER.